United States Patent
Georgiev

(10) Patent No.: US 8,238,738 B2
(45) Date of Patent: *Aug. 7, 2012

(54) PLENOPTIC CAMERA

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 12/574,183

(22) Filed: Oct. 6, 2009

(65) Prior Publication Data

US 2010/0020187 A1    Jan. 28, 2010

Related U.S. Application Data

(63) Continuation of application No. 11/398,403, filed on Apr. 4, 2006, now Pat. No. 7,620,309.

(51) Int. Cl.
*G03B 13/00* (2006.01)
*G02B 13/10* (2006.01)

(52) U.S. Cl. ......... 396/113; 359/619; 348/340; 396/333

(58) Field of Classification Search .......... 396/113, 396/333; 359/619; 348/340
See application file for complete search history.

(56) References Cited

U.S. PATENT DOCUMENTS

| | | |
|---|---|---|
| 725,567 A | 4/1903 | Ives |
| 2,039,648 A | 5/1936 | Ives |
| 3,985,419 A | 10/1976 | Matsumoto et al. |
| 4,180,313 A | 12/1979 | Inuiya |
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de montebello et al. |
| 4,849,782 A | 7/1989 | Koyama et al. |
| 5,076,687 A | 12/1991 | Adelson |

(Continued)

FOREIGN PATENT DOCUMENTS

EP    1548481    6/2005
(Continued)

OTHER PUBLICATIONS

Park, S., Park, M., and Kang, M., "Super-resolution image reconstruction: a technical overview," Signal Processing Magazine, 2003, 16 pages.

(Continued)

*Primary Examiner* — Christopher Mahoney
*Assistant Examiner* — Fang-Chi Chang
(74) *Attorney, Agent, or Firm* — Robert C. Kowert; Meyertons, Hood, Kivlin, Kowert & Goetzel, P.C.

(57) ABSTRACT

One embodiment of the present invention provides a plenoptic camera which captures information about the direction distribution of light rays entering the camera. Like a conventional camera, this plenoptic camera includes a main lens which receives light from objects in an object field and directs the received light onto an image plane of the camera. It also includes a photodetector array located at the image plane of the camera, which captures the received light to produce an image. However, unlike a conventional camera, the plenoptic camera additionally includes an array of optical elements located between the object field and the main lens. Each optical element in this array receives light from the object field from a different angle than the other optical elements in the array, and consequently directs a different view of the object field into the main lens. In this way, the photodetector array receives a different view of the object field from each optical element in the array.

20 Claims, 11 Drawing Sheets

U.S. PATENT DOCUMENTS

| | | | |
|---|---|---|---|
| 5,361,127 | A | 11/1994 | Daily |
| 5,400,093 | A | 3/1995 | Timmers |
| 5,659,420 | A | 8/1997 | Wakai et al. |
| 5,729,011 | A | 3/1998 | Sekiguchi |
| 5,946,077 | A | 8/1999 | Nemirovskiy |
| 6,097,394 | A | 8/2000 | Levoy et al. |
| 6,097,541 | A | 8/2000 | Davies et al. |
| 6,137,535 | A | 10/2000 | Meyers |
| 6,137,937 | A | 10/2000 | Okano et al. |
| 6,268,846 | B1 | 7/2001 | Georgiev |
| 6,301,416 | B1 | 10/2001 | Okano et al. |
| 6,339,506 | B1 | 1/2002 | Wakelin et al. |
| 6,351,269 | B1 | 2/2002 | Georgiev |
| 6,476,805 | B1 | 11/2002 | Shum et al. |
| 6,738,533 | B1 | 5/2004 | Shum et al. |
| 6,838,650 | B1 | 1/2005 | Toh |
| 7,019,671 | B2 | 3/2006 | Kawai |
| 7,054,067 | B2 | 5/2006 | Okano et al. |
| 7,085,062 | B2 | 8/2006 | Hauschild |
| 7,620,309 | B2 | 11/2009 | Georgiev |
| 7,732,744 | B2 | 6/2010 | Utagawa |
| 7,792,423 | B2 | 9/2010 | Raskar et al. |
| 7,880,794 | B2 | 2/2011 | Yamagata et al. |
| 7,962,033 | B2 | 6/2011 | Georgiev et al. |
| 8,019,215 | B2 | 9/2011 | Georgiev et al. |
| 2001/0012149 | A1 | 8/2001 | Lin et al. |
| 2001/0050813 | A1 | 12/2001 | Allio |
| 2002/0140835 | A1 | 10/2002 | Silverstein |
| 2003/0231255 | A1 | 12/2003 | Szajewski et al. |
| 2004/0114807 | A1 | 6/2004 | Lelescu et al. |
| 2004/0223214 | A1 | 11/2004 | Atkinson |
| 2005/0088714 | A1 | 4/2005 | Kremen |
| 2005/0122418 | A1 | 6/2005 | Okita et al. |
| 2006/0104542 | A1 | 5/2006 | Blake et al. |
| 2007/0091197 | A1 | 4/2007 | Okayama et al. |
| 2007/0252074 | A1 | 11/2007 | Ng et al. |
| 2008/0056549 | A1 | 3/2008 | Hamill et al. |
| 2008/0107231 | A1 | 5/2008 | Miyazaki et al. |
| 2008/0152215 | A1 | 6/2008 | Horie et al. |
| 2008/0165270 | A1 | 7/2008 | Watanabe et al. |
| 2008/0166063 | A1 | 7/2008 | Zeng |
| 2008/0187305 | A1 | 8/2008 | Raskar et al. |
| 2008/0193026 | A1 | 8/2008 | Horie et al. |
| 2008/0218610 | A1 | 9/2008 | Chapman et al. |
| 2008/0247623 | A1 | 10/2008 | Delso et al. |
| 2009/0041381 | A1 | 2/2009 | Georgiev |
| 2009/0041448 | A1 | 2/2009 | Georgiev |
| 2009/0086304 | A1 | 4/2009 | Yurlov et al. |
| 2009/0140131 | A1 | 6/2009 | Utagawa |
| 2009/0185801 | A1 | 7/2009 | Georgiev et al. |
| 2009/0295829 | A1 | 12/2009 | Georgiev et al. |
| 2010/0026852 | A1 | 2/2010 | Ng et al. |
| 2010/0085468 | A1 | 4/2010 | Park et al. |
| 2010/0205388 | A1 | 8/2010 | MacInnis |
| 2010/0265386 | A1 | 10/2010 | Raskar et al. |

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | 2007/115281 | 10/2007 |

OTHER PUBLICATIONS

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, 1 (Jan. 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Georgiev T., Lumsdaine A.: Depth of field in plenoptic cameras. In Eurographics 2009—Annex (Apr. 2009), pp. 5-8.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," ADOBE Technical Report, Apr. 2007, all pages.

International Search Report from Application No. 07 760 021.1-1241, mailed on Apr. 21, 2010, 7 pages.

JP504669 (1975), all pages, english equivalent is U.S. Patent 3985419, dated Oct. 12, 1976 by Matsumoto, et al.

Office Action from Japanese Patent Application No. 2009-504414, mailed Nov. 29, 2011, Adobe Systems Incorporated, all pages.

Levoy, Mark et al., "Light Field Microscopy," Stanford University, Submitted to Siggraph 2006, 5 pages.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Georgiev T., Wainer M.: "Morphing Between Multiple Images," Tech. Rep. (1997).

Isaksen A., McMillan L., Gortler S. J.: "Dynamically Reparameterized Light Fields," ACM Trans. Graph. (2000), 297-306.

Xiao J., Shah M.: "Tri-view Morphing," Computer Vision and Image Understanding 96,3 (2004).

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Ng R.: "Fourier Slice Photography," Proceedings of ACM SIGGRAPH (Jan. 2005).

Naemura T., Yoshida T., Harashima H.: "3d Computer Graphics Based on Integral Photography," Optics Express, vol. 8, 2 (2001).
Zitnick C. L., Jojic N., Kang S.: "Consistent Segmentation for Optical Flow Estimation" in Proceedings of IEEE International Conference on Computer Vision (ICCV) (2005).
Seitz S. M., Dyer C. R.: "View Morphing," ACM Trans. Graph. (1996), 21-30.
Stevens R., Harvey T.: "Lens Arrays for a Three-dimensional Imaging System," Journal of Optics A, vol. 4 (2002).
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).
U.S. Appl. No. 11/627,141, filed Jan. 25, 2007.
U.S. Appl. No. 12/144,411, filed Jun. 23, 2008.
U.S. Appl. No. 12/186,396, filed Jun. 23, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010; and U.S. Appl. No. 12/5503,803, filed Jul. 15, 2009.
Georgeiv, et al. "Spatio-Angular Resolution Tradeoff in Integral Photography," Proc. EGSR, 2006, 10 pages.
U.S. Appl. No. 12/628,437, filed Dec. 1, 2009; and U.S. Appl. No. 12/790,677, filed May 28, 2010.
Levoy, Mark, "Optical Recipes for Light Microscopes," Stanford Computer Grpahics Laboratory Technical Memo 2006-001, Jun. 20, 2006, 10 pages.
Yang, J C, et al., "A Real-Time Distributed Light Field Camera," Rendering Techniques 2002, Eurographics Workshop Proceedings, PIS, Italy, Jun. 26-28, 2002, 9 pages.
Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.
M. Levoy, "Light Fields and computational Imaging," Computer [Online], vol. 39, No. 8, Aug. 2006, pp. 46-55, XP002501300.
Levoy M., Hanrahan P.: "Light Field Rendering," ACM Trans. Graph. (1996), 31-42.
J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.
Todor Georgiev and Chintan Intwala: "Light Field Camera Design For Integral View Photography," Adobe Tech. Rep., 2006, 13 pages.
J. Neumann, et al., "Eyes from Eyes Analysis of Camera Design Using Plenoptic Video Geometry," Dec. 2001, 20 pages, XP002509893.
Zhang, et al., "A Survey on Image-based Rendering-Representation, Sampling and Compression," Signal Processing, Image Communication, Elsevier Science Publishers, vol. 19, No. 1, Jan. 1, 2004, 28 pages.
Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.
Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.
Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.
Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.
Chang, et al., "Light Field Compression Using Disparity-Compensated Lifting and Shape Adaptation," IEEE Transactions on Image Processing, vol. 15, No. 4, Apr. 2006, pp. 793-806.
Sebe, et al., "Mutli-View Geometry Estimation for Light Field Compression," VMV 2002, 8 pages.
Borman, S., and Stevenson, R., "Super-resolution from image sequences—a review", Proceedings of the 1998 Midwest Symposium on Circuits and Systems, Publication Date: Aug. 9-12, 1998, On pp. 374-378.
Elad, M., and Feuer, A., "Restoration of a single superresolution image from several blurred, noisy and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, 12 pages.
Search Report for PCT/US2007/065855, mailed Jul. 25, 2007.11 pages.
Adelson, T., et al. "Single Lens Stereo with a Plenoptic Camera," IEEE Transactions on Pattern Analysis and Machine Intelligence 14, Feb. 2, 1992, pp. 99-106.
Ng, R., et al, "Light Field Photography with a Hand-Held Plenoptic Camera," Stanford Univ. Computer Science Tech Report CSTR Feb. 2005, Apr. 2005.

PLENOPTIC CAMERA

This application is a continuation of U.S. patent application Ser. No. 11/398,403, filed Apr. 4, 2006 now U.S. Pat. No. 7,620,309.

COLOR DRAWINGS

The patent or application file contains at least one drawing executed in color. Copies of this patent or patent application publication with color drawing(s) will be provided by the Office upon request and payment of the necessary fee.

BACKGROUND

1. Field of the Invention

The present invention relates to cameras. More specifically, the present invention relates the design of a "plenoptic" camera, which captures information about the direction distribution of light rays entering the camera.

2. Related Art

Conventional cameras fail to capture a large amount of optical information. In particular, a conventional camera does not capture information about the location of the aperture of the light rays entering the camera. During operation, a conventional digital camera captures a two-dimensional (2D) image representing a total amount of light which strikes each point on a photosensor within the camera. However, this 2D image contains no information about the directional distribution of the light that strikes the photosensor. This directional information at the pixels corresponds to locational information at the aperture.

In contrast, a "plenoptic" camera samples the four-dimensional (4D) optical phase space or light field and in doing so captures information about the directional distribution of the light rays. For example, see [Adelson92] Adelson, T., and Wang, J. Y. A. 1992, "Single lens stereo with a plenoptic camera," *IEEE Transactions on Pattern Analysis and Machine Intelligence* 14, 2, Feb. 1992, pp. 99-106. Also see [Ng05] Ng, R., Levoy, M., Bredif, M., Duval, G., Horowitz, M. and Hanrahan, P., "Light Field Photography with a Hand-Held Plenoptic Camera," *Stanford University Computer Science Tech Report CSTR* 2005-02, April 2005. These papers describe plenoptic/light-field camera designs based on modifications to a conventional digital camera.

Referring to FIG. 1A, the system described in [Ng05] uses a microlens array 106 comprised of about 100,000 lenslets which is placed a small distance (0.5 mm) from a CCD array 108. Each lenslet splits a beam coming to it from the main lens 104 into (100) rays coming from different "pinhole" locations on the aperture of the main lens 108. Each of these rays is recorded as a pixel, and the pixels under each lenslet collectively form a 100-pixel image. If we call this 100-pixel image a "macropixel," then the plenoptic photograph captured by this camera will contain approximately 100,000 macropixels. By appropriately selecting a pixel from each macropixel, we can create conventional pictures taken with a virtual pinhole camera. Moreover, by mixing such images appropriately, we can refocus images originally taken out-of-focus, reduce noise, or achieve other "light-field" effects, as described in the papers above.

In the prototype described in [Ng05], a 16-megapixel sensor is used with an approximately 100,000 lenslet array to create a final output of approximately 300×300 macropixels, with one macropixel per lenslet. The macropixel created by each lenslet comprises approximately 150 pixels. However, only about 100 of these pixels are useful because of poor quality of edge pixels caused by a problem which is referred to as "vignetting." These 100 pixels which comprise each macropixel make the captured data equivalent to 100 conventional images, one for each choice of the pixel inside a macropixel. The size of each picture produced by processing data from this camera is equal to the number of lenslets, and is hence 300×300.

Unfortunately, an image with only 300×300 pixels has insufficient resolution for most practical uses. The number of pixels can be increased by increasing the number of lenslets and making them smaller. Unfortunately, the prior art cannot use the border pixels of each image. Note that a band of about 2 to 4 pixels along the border of the macropixel is lost depending upon whether the system is working with a Grayscale pattern or a Bayer pattern. When the image is small, these few border pixels comprise a large percentage of the image. For example, in a 10×10 color image, 4 pixels on each edge may be lost leaving only 2×2=4 central pixels. In this case, 96% of the information lost! Because of this problem, the system described in [Ng05] cannot reduce the size of each microlens and the image under it. Consequently, the number of microlenses, and hence the resolution of the image, is limited. (Currently, in a system that uses a 16-megapixel sensor, the number of microlenses is limited to less than 100,000.)

Hence, what is needed is a method and an apparatus for increasing the resolution of a plenoptic camera without the above-described problems.

SUMMARY

One embodiment of the present invention provides a plenoptic camera which captures information about the direction distribution of light rays entering the camera. Like a conventional camera, this plenoptic camera includes a main lens which receives light from objects in an object field and directs the received light onto an image plane of the camera. It also includes a photodetector array located at the image plane of the camera, which captures the received light to produce an image. However, unlike a conventional camera, the plenoptic camera additionally includes an array of optical elements located between the object field and the main lens. Each optical element in this array receives light from the object field from a different angle than the other optical elements in the array, and consequently directs a different view of the object field into the main lens. In this way, the photodetector array receives a different view of the object field from each optical element in the array.

In a variation on this embodiment, a given optical element in the array of optical elements includes: a lens; a prism; or a lens and a prism.

In a further variation, the lens is a negative lens with a negative focal length.

In a further variation, the lens is an achromatic lens, and the prism is an achromatic prism.

In a variation on this embodiment, the photodetector array is a Charge-Coupled Device (CCD) array.

One embodiment or the present invention additionally includes a processing mechanism configured to process the different views of the object field received by the photodetector array to produce a final image.

In a further variation, while producing the final image, the processing mechanism is configured to use the different views of the object field to adjust one or more of the following: a plane-of-focus for the final image; a viewing angle for the final image; or a depth-of-field for the final image.

In a further variation, while processing the different views of the object field, the processing mechanism is configured to perform view-morphing or interpolation operations between the different views to produce additional views of the object field which appear to be gathered from locations between the locations of the optical elements in the array.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

In the system described in [Ng05], the size of each image for each macropixel is limited by the design of the camera. The present invention provides a new, easier-to-construct camera, which gives the designer more flexibility in the trade off between the number of views and the size of each view image. In particular, one embodiment of the present invention can capture a small number (10) of high-resolution images, whereas the system described in [Ng05] captures a large number (100) of low-resolution images.

Hence, one embodiment of the present invention provides a design in which a small number of conventional lenses are placed in front of the main lens of the camera, instead of placing a much larger number of microlenses behind the main lens as is disclosed in [Ng05], thereby making plenoptic cameras much easier to build.

Note that the present invention makes it possible to reduce the number of effective images captured (from 100 in the prior art, down to 20, or even to 10) without loss of quality at the edge pixels. This is a major problem for the system disclosed in [Ng05], which limits image resolution to 300×300 macropixels. Using the same type of optical sensor, the present invention can achieve a significantly higher resolution for the final image (for example, five times the resolution). In other words, the present invention provides the flexibility to trade detail in the 3D information for detail in the 2D images. For simple scenes, composed of a few surfaces in 3D, a few images are sufficient to capture the complete 3D detail. (For example, the human visual system uses only two images.) This speaks in favor of reducing the number of images, because 100 images is probably excessive, and 10 or 20 images is probably more appropriate. Embodiments of the present invention makes this possible, while it was not possible in the prior art.

Figure 1A:
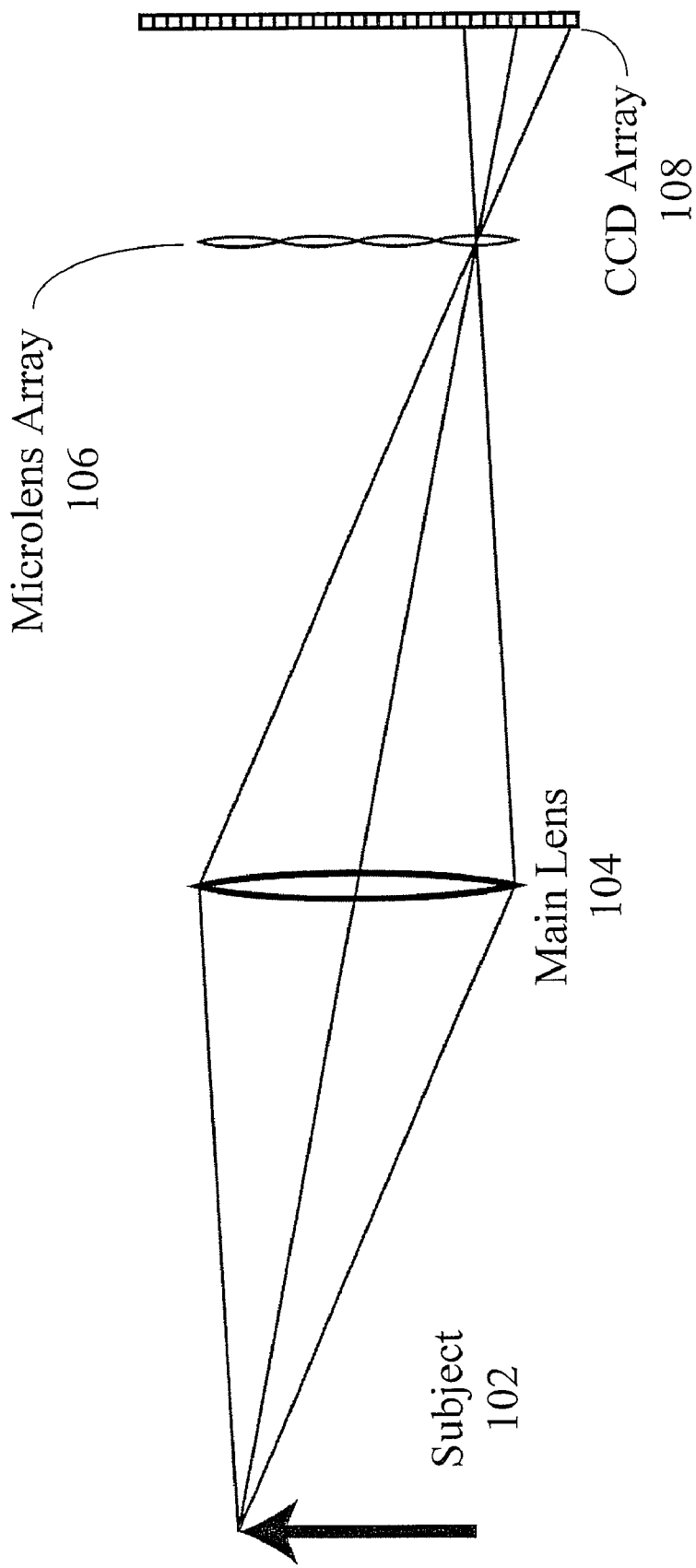
FIG. 1A illustrates a prior art plenoptic camera.
Figure 1B:
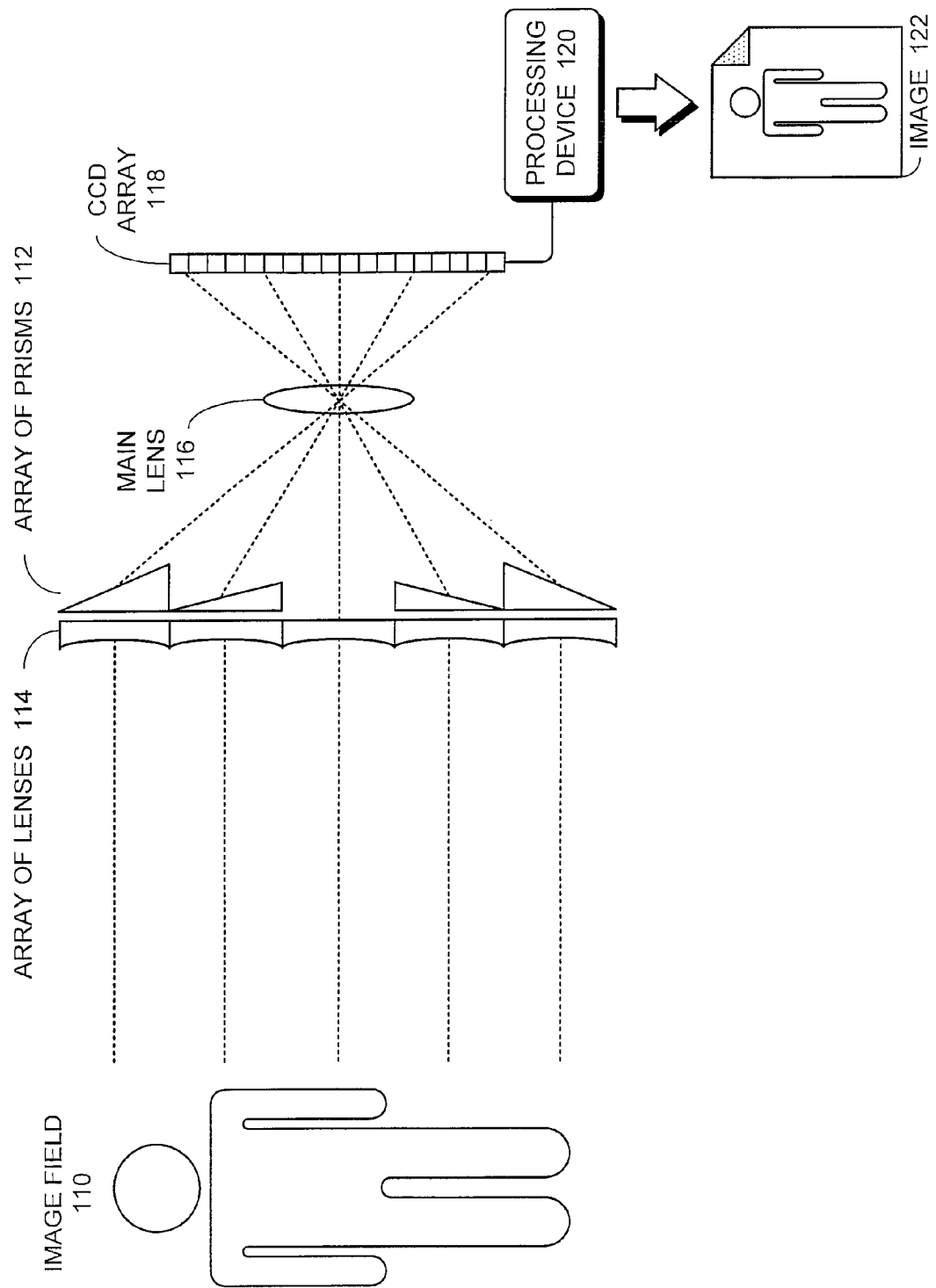
FIG. 1B illustrates a plenoptic camera in accordance with an embodiment of the present invention.

Instead of locating the array of lenses behind the main lens, as in the prior art system illustrated in FIG. 1A, the present invention places the array of lenses 114 in front of the main lens 116 as is illustrated in FIG. 1B. More specifically, one embodiment of the present invention achieves higher-resolution results by placing 19 lenses/prisms in front of the main lens instead of placing 90,000 lenses behind the main lens.

In the embodiment of the present invention illustrated in FIG. 1B, an array of (about 10 to 100) lenses 114 and prisms 112 is placed 200 to 500 mm in front of the main lens 116 of a conventional camera. Note that the ratio of (width of array of lenses)/(distance to main lens) is ideally equal to the f-number of main lens 116.

Each lens is coupled with a corresponding achromatic prism, wherein the prism has a different angle for different lenses, depending on location of the lens. In particular, each prism is chosen to produce an angular deviation which is equal to the angle at which the main camera lens sees that prism. In this way, all prisms create images of the same object from the scene. Note that it is not essential to achieve precision with these prism angles and the arrangement of the prisms because small errors do not influence the final image quality. However, big errors should be avoided to ensure that pixels are not wasted due to random shifts of images which create gaps and/or overlaps.

In one embodiment of the present invention, all of the lenses have the same negative focal length, for example –100 mm. This focal length controls the field of view. Note that it is important for all lenses to have the same focal length if we want good focusing.

The main lens 116 of the camera is focused on an array of virtual images which appear in front of the negative lenses. Note that each lens/prism in the array receives light from image field 110 from a different angle than the other lenses/prisms in the array, and consequently directs a different view of the image field 110 into the main lens 116 of the camera. In this way, CCD array 118 captures an array of pictures in which each picture provides a different view of the object field from a different lens/prism in the array.

The array of pictures captured by CCD array 118 is processed by processing device 120 to produce a final image 122. (Note that processing device 120 can be integrated into the camera or can be located outside of the camera.) By mixing these images appropriately, processing device 120 can achieve various "light-field" effects, such as refocusing an image, reducing noise, adjusting the viewing angle, and adjusting the depth-of-field for the final image. (For a description of the details of some of these light-field effects, please see [Adelson92] and [Ng05], also see U.S. Pat. No. 5,076, 687, entitled "Optical Ranging Apparatus," by inventor Edward H. Adelson.)

In one embodiment of the present invention, processing device 120 is additionally configured to perform view-morphing or interpolation operations between the different views to produce additional views of the object field which appear to be gathered from locations between the locations of the lenses/prisms in the array. In this way, the present invention can produce a large number of images (100) using a smaller number of lenses (20). (This type of view-morphing operation is described in U.S. Pat. No. 6,351,269, entitled "Multiple Image Morphing," by inventor Todor Georgiev.)

Note that generating these additional views greatly opens up the design space because the resulting system generates a large number of "high-resolution" images. This is an improvement over the system described in [Ng05], which captures a large number of "low-resolution" images.

Exemplary Embodiment

Figure 2:
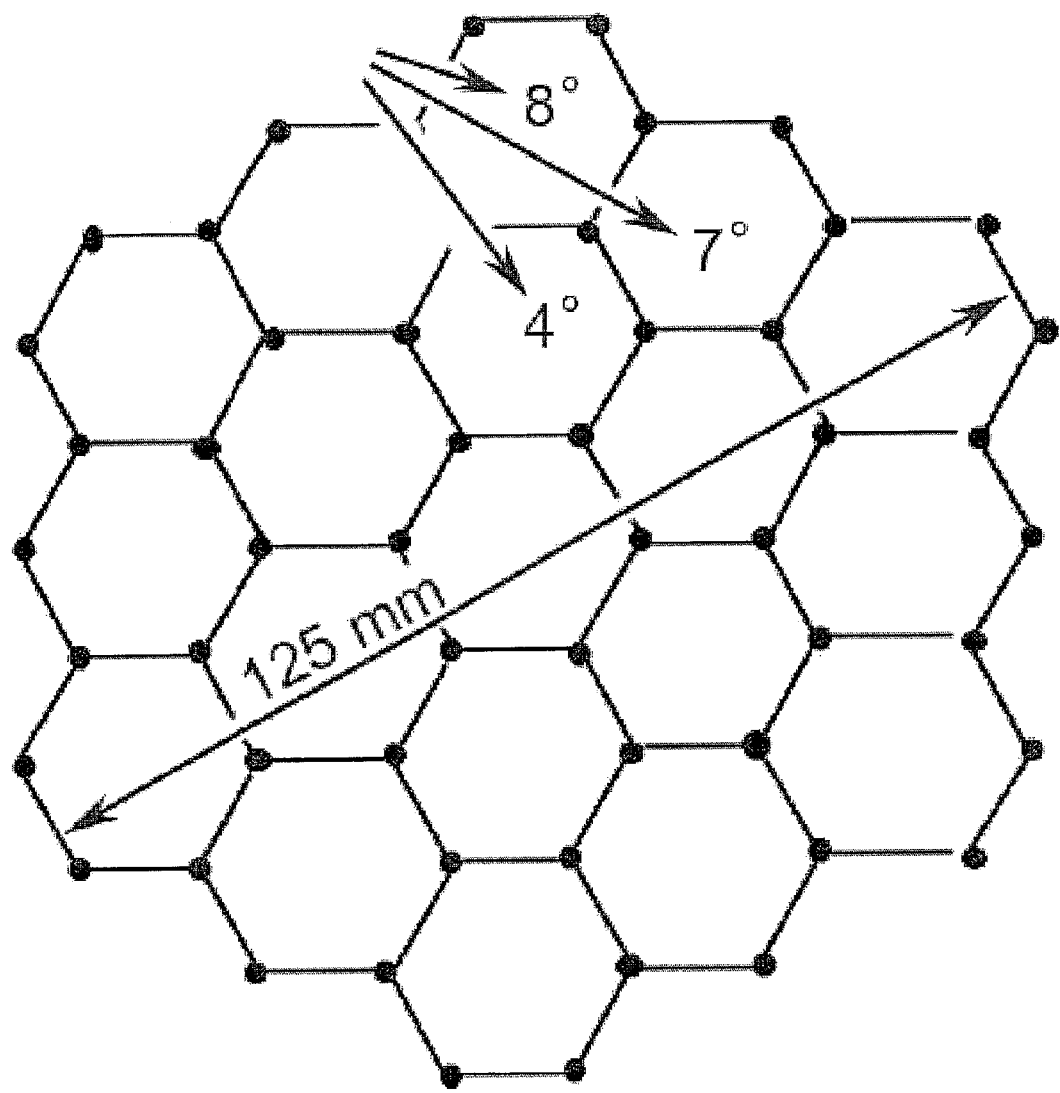
FIG. 2 illustrates a layout for the additional lenses and prisms in a plenoptic camera in accordance with an embodiment of the present invention.
Figure 3:
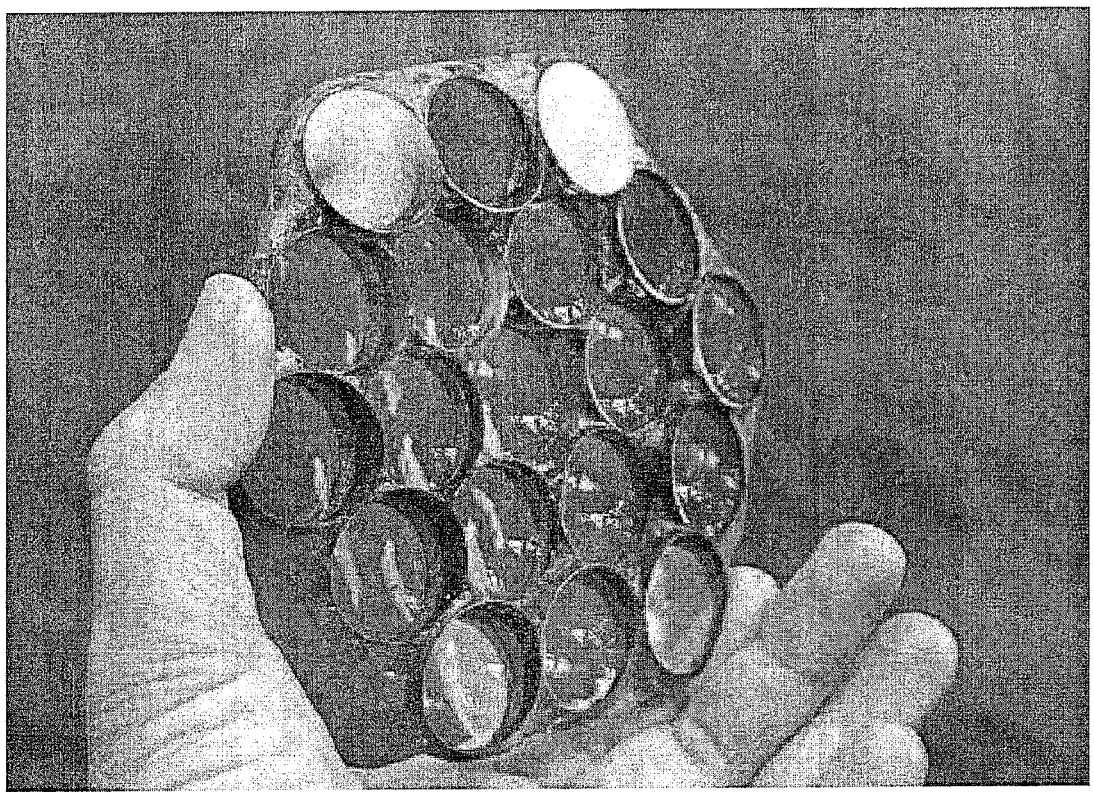
FIG. 3 illustrates an array of lenses and prisms in accordance with an embodiment of the present invention.

In an exemplary embodiment of the present invention, the array of lenses 114 contains 19 lenses (with f=−100 mm), and 18 prisms which are arranged in a hexagonal pattern as is illustrated in FIGS. 2 and 3. Note that the central lens has no prism because it is located on the main axis of the camera. The main camera lens has f-number f/2, which corresponds to 14 degrees. To accommodate this f-number, the prisms are chosen with deviation angles of 4 degrees, 7 degrees and 8 degrees as is illustrated in FIG. 2. In the exemplary embodiment, the lenses have diameter 25 mm and the total width of the array of lenses 114 is 125 mm. Moreover, the array is positioned at distance of 250 mm from main lens 116. (Note that this distance can be adjusted.) With a 16-megapixel CCD array, this embodiment is able to capture final images of about 600×600 pixels, which is 4 times better than the camera described in [Ng05] for the same camera resolution.

Note that a tube, which looks like a telephoto lens can extend from the main lens to the array of lenses to prevent light from entering the system sideways and forming reflection spots on the prisms and lenses.

Lenses and Prisms

Figure 4:
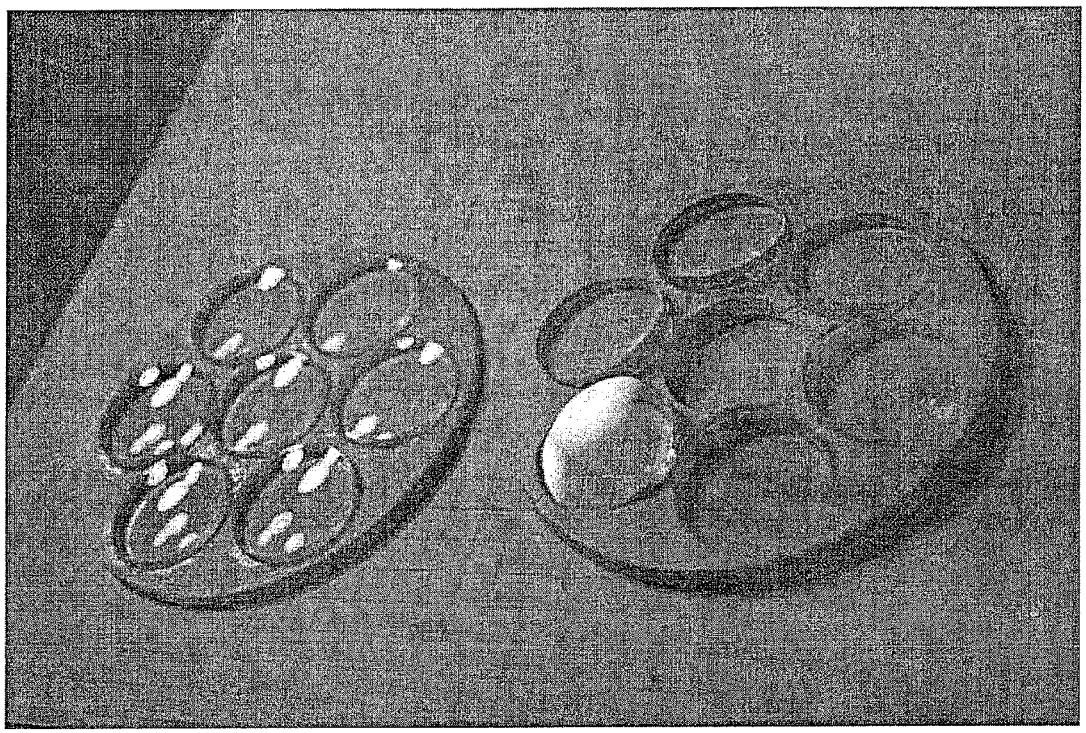
FIG. 4 illustrates an array of lenses and an array of prisms in accordance with an embodiment of the present invention.
Figure 5:
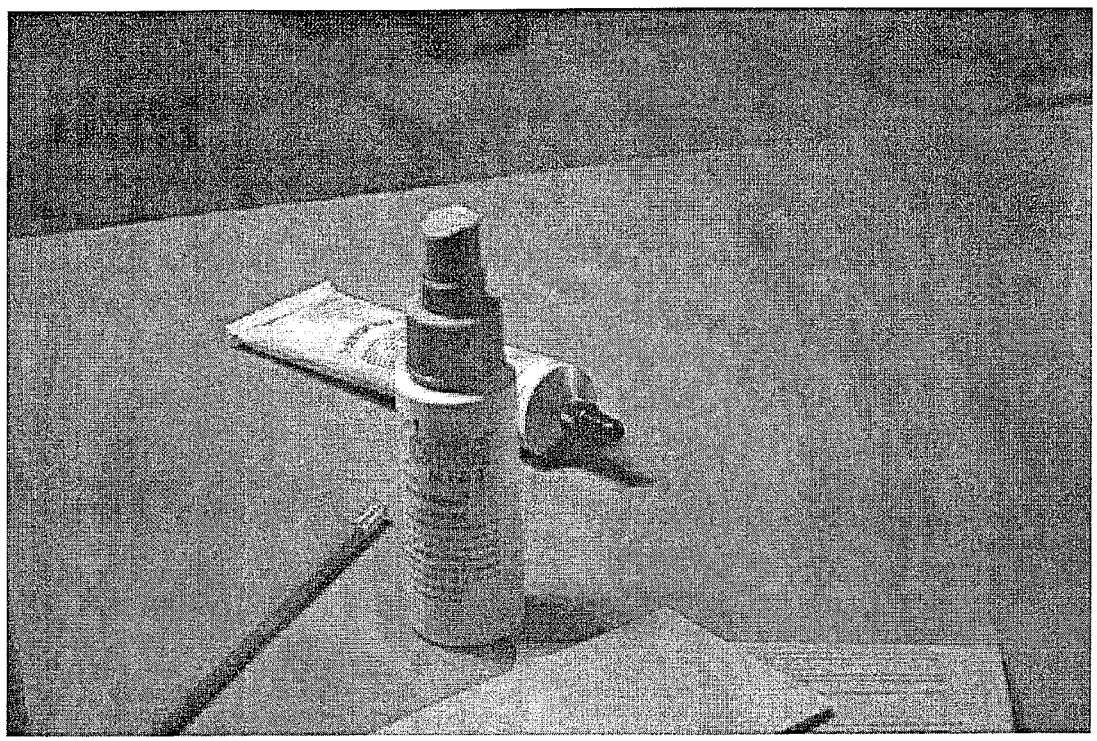
FIG. 5 illustrates an exemplary scene in accordance with an embodiment of the present invention.

One embodiment of the present invention can operate using prisms only and using lenses only, but it is preferable to use both lenses and prisms. To illustrate this, a number of pictures have been taken through the array of 7 negative lenses and the corresponding array of 6 prisms illustrated in FIG. 4. These lenses and prisms are used to capture images of an exemplary scene which appears in FIG. 5.

Figure 6:
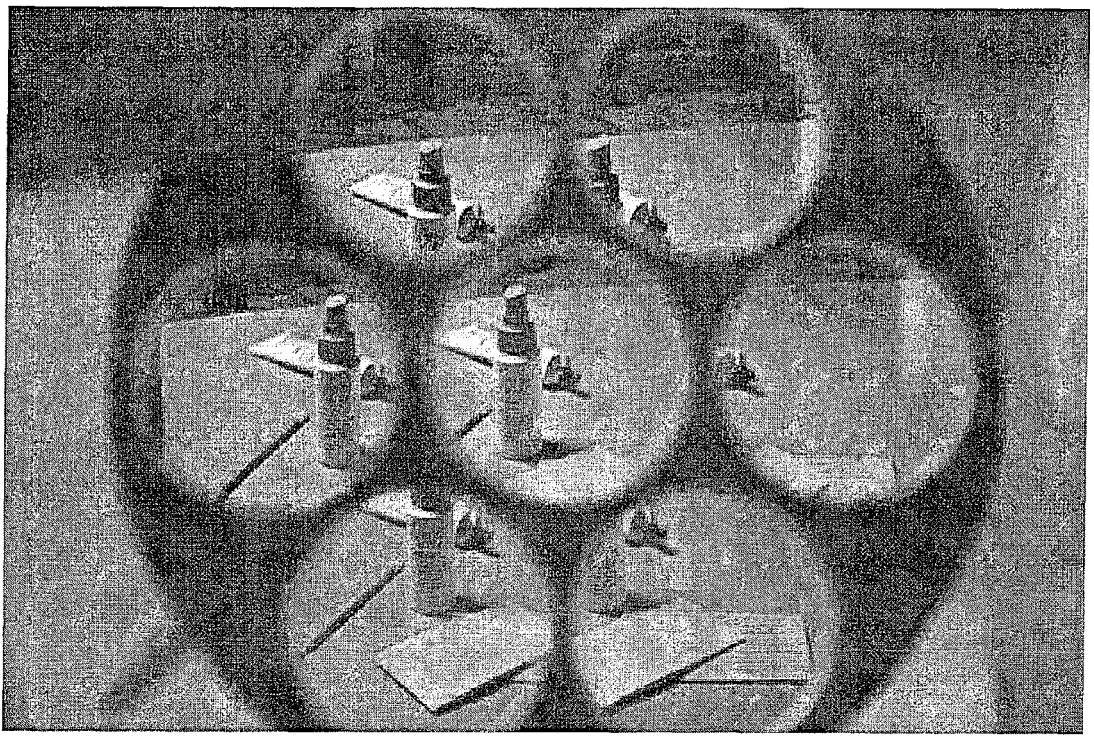
FIG. 6 presents images of the exemplary scene taken through an array of lenses in accordance with an embodiment of the present invention.

FIG. 6 illustrates images of the exemplary scene which are taken through the array of lenses only. Note that these images are shifted with respect to each other and do not capture identical areas of the scene, although there is a small area of the scene near the cap of the tube which appears in all of the images.

Figure 7:
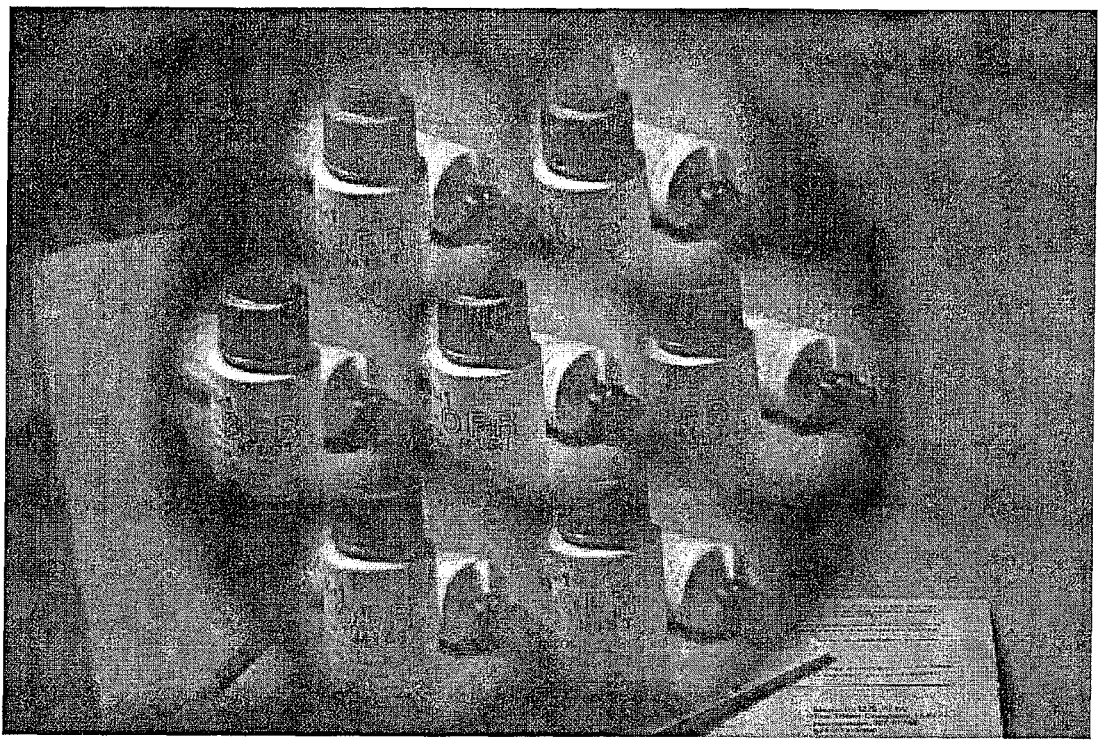
FIG. 7 presents images of the exemplary scene taken through an array of prisms in accordance with an embodiment of the present invention.

FIG. 7 presents images of the exemplary scene which are taken through the array of prisms only. Note that these prisms shift the images so the same part of the scene is captured in each image. However, the resulting field of view is quite narrow.

Figure 8:
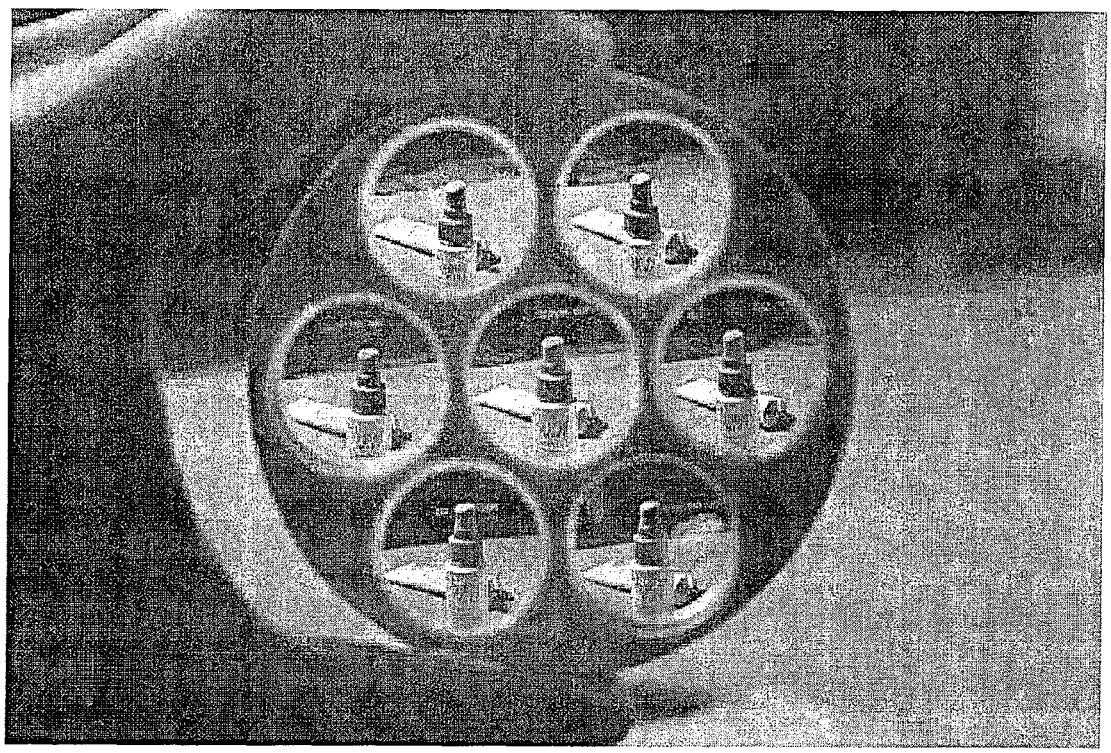
FIG. 8 presents images of the exemplary scene taken through both the array of lenses and the array of prisms in accordance with an embodiment of the present invention.

Finally, FIG. 8 presents images of the exemplary scene which are taken through both the array of lenses and the array of prisms. Note that the prisms shift the images so that all the images are centered and the lenses expand the field of view. Also note that each two images form a stereo pair.

By using a negative lens instead of a positive lens, the plane where the image is formed is further away from the camera. This makes the resulting system more compact, because it allows the array of lenses to be closer to the main lens.

Generating a Resulting Image

Figure 9C:
FIG. 9C illustrates an image of the exemplary scene which is generated with the background in-focus in accordance with an embodiment of the present invention.
Figure 9B:
FIG. 9B illustrates an image of the exemplary scene which is generated with the foreground in-focus in accordance with an embodiment of the present invention.
Figure 9A:
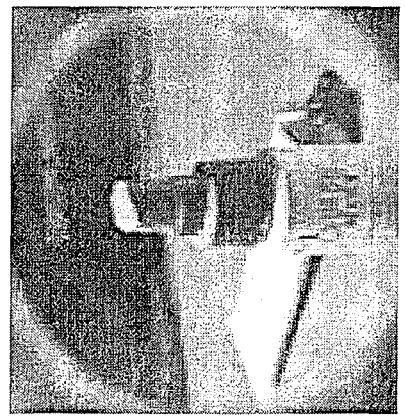
FIG. 9A illustrates an image of the exemplary scene which is generated so that both the foreground and background are in-focus in accordance with an embodiment of the present invention.

As mentioned above, the present invention can achieve various "light-field" effects, such as refocusing, reducing noise, adjusting the viewing angle, and adjusting the depth-of-field for the image. For example, FIGS. 9A-9C illustrates how one embodiment of the system can virtually focus on different image planes after a picture has been taken in accordance with an embodiment of the present invention. In FIG. 9A, the depth-of-field of the image is large, so both the bottle in the foreground and the tube in background are in-focus. In FIG. 9B, the depth-of-field is reduced and the focal plane of the image is set to be nearer to the camera, so the bottle in the foreground is in-focus, while the tube in the background in out-of-focus. In FIG. 9C, the focal plane of the image is set to be farther from the camera, so the tube in the background is in-focus, while the tube in the foreground is out-of-focus.

Light Flow

Figure 10:
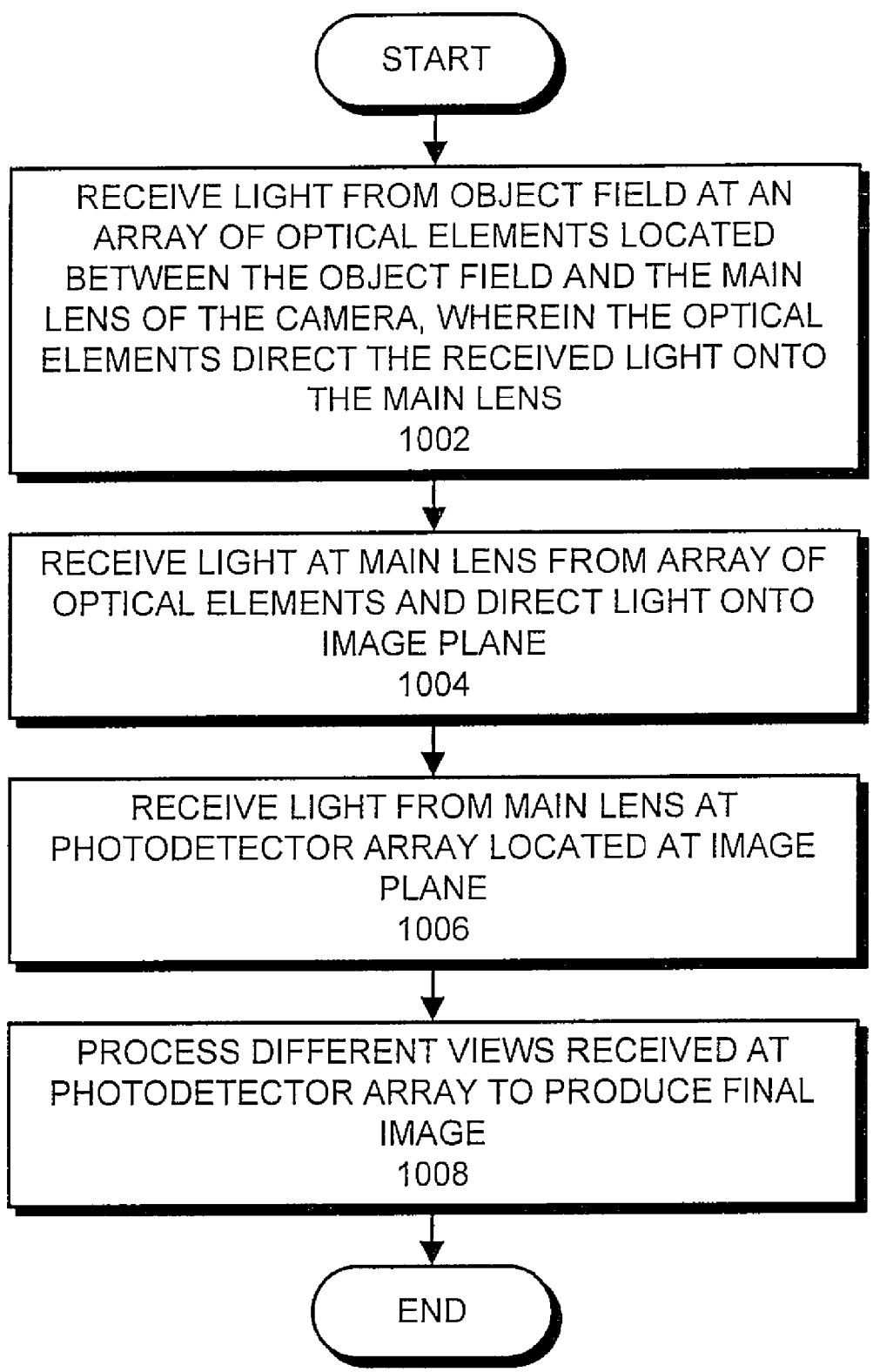
FIG. 10 presents a flow chart illustrating how light is directed within a plenoptic camera in accordance with an embodiment of the present invention.

FIG. 10 presents a flow chart illustrating how light is directed within a plenoptic camera in accordance with an embodiment of the present invention. First, light is received from objects in an object field at an array of optical elements located between the object field and the main lens of the camera (step 1002). Each optical element in this array receives light from the object field from a different angle, and consequently directs a different view of the object field into the main lens.

Next, light is received from the array of optical elements at the main lens which directs the received light onto an image plane of the camera (step 1004).

Then, light is received from the main lens at a photodetector array located at the image place of the camera (step 1006), wherein the photodetector array receives a different view of the object field from each optical element in the array.

Finally, the different views of the object field which are received by the photodetector array are processed to produce a final image (step 1008).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:
1. A camera, comprising:
a main lens which receives light from objects in an object field and directs the received light onto an image plane of the camera;
a photodetector array located at the image plane of the camera, which captures the received light to produce an image; and a multidimensional array of optical elements located between the object field and the main lens, wherein each optical element in the array receives light from the object field from a different angle than the other optical elements in the array of optical elements and consequently directs a view of the object field into the main lens, whereby the photodetector array receives a different view of the object field from each optical element in the multidimensional array of optical elements;

wherein each different view of the object field is received at a separate location on the photodetector array to produce a multidimensional array of different views of the object field at the photodetector array.

2. The camera of claim 1, wherein a given optical element in the array of optical elements includes:
   a lens;
   a prism; or
   a lens and a prism.

3. The camera of claim 1, wherein one or more of the optical elements comprise negative lenses with negative focal length.

4. The camera of claim 1, wherein a plurality of the optical elements comprise:
   achromatic lenses of a same focal length; or
   an achromatic prism.

5. The camera of claim 1, wherein the photodetector array is a Charge-Coupled Device (CCD) array.

6. The camera of claim 1, further comprising a processing mechanism configured to process the different views of the object field received by the photodetector array to produce a final image.

7. The camera of claim 6, wherein while producing the final image, the processing mechanism is configured to use the different views of the object field to adjust one or more of the following:
   a plane-of-focus for the final image;
   a viewing angle for the final image; or
   a depth-of-field for the final image.

8. The camera of claim 6, wherein while processing the different views of the object field, the processing mechanism is configured to perform view-morphing or interpolation operations between the different views to produce additional views of the object field which appear to be gathered from locations between the locations of the optical elements in the array of optical elements.

9. A method for gathering light, comprising:
   receiving light from objects in an object field at a multidimensional array of optical elements located between the object field and a main lens of a camera, wherein each optical element in the array of optical elements receives light from the object field from a different angle than the other optical elements in the array of optical elements and consequently directs a different view of the object field into the main lens;
   receiving light from the array of optical elements at the main lens which directs the received light onto an image plane of the camera; and
   receiving light from the main lens at a photodetector array located at the image plane of the camera, wherein the photodetector array receives a different view of the object field from each optical element in the multidimensional array of optical elements, wherein each different view of the object field is received at a separate location on the photodetector array to produce a multidimensional array of different views of the object field at the photodetector array.

10. The method of claim 9, wherein a given optical element in the array of optical elements includes:
    a lens;
    a prism; or
    a lens and a prism.

11. The method of claim 9, wherein one or more of the optical elements comprise negative lenses with negative focal length.

12. The method of claim 9, wherein a plurality of the optical elements comprise:
    achromatic lenses of a same focal length; or
    an achromatic prism.

13. The method of claim 9, wherein the photodetector array is a Charge-Coupled Device (CCD) array.

14. The method of claim 9, further comprising processing the different views of the object field received by the photodetector array to produce a final image.

15. The method of claim 14, wherein producing the final image involves using the different views of the object field to adjust one or more of the following:
    a plane-of-focus for the final image;
    a viewing angle for the final image; or
    a depth-of-field for the final image.

16. The method of claim 14, wherein processing the different views of the object field involves performing view-morphing or interpolation operations between the different views to produce additional views of the object field which appear to be gathered from locations between the locations of the optical elements in the array of optical elements.

17. An imaging system, comprising:
    a main lens which receives light from objects in an object field and directs the received light onto an image plane;
    a photodetector array located at the image plane, which captures the received light to produce an image;
    a multidimensional array of optical elements located between the object field and the main lens, wherein each optical element in the array receives light from the object field from a different angle than the other optical elements in the multidimensional array of optical elements and consequently directs a view of the object field into the main lens, whereby the photodetector array receives a different view of the object field from each optical element in the array of optical elements;
    wherein each different view of the object field is received at a separate location on the photodetector array to produce a multidimensional array of different views of the object field at the photodetector array; and
    a processing mechanism configured to process the different views of the object field received by the photodetector array to produce a final image.

18. The imaging system of claim 17, wherein a given optical element in the array of optical elements includes:
    a lens;
    a prism; or
    a lens and a prism.

19. The imaging system of claim 17, wherein while producing the final image, the processing mechanism is configured to use the different views of the object field to adjust one or more of the following:
    a plane-of-focus for the final image;
    a viewing angle for the final image; or
    a depth-of-field for the final image.

20. The imaging system of claim 17, wherein while processing the different views of the object field, the processing mechanism is configured to perform view-morphing or interpolation operations between the different views to produce additional views of the object field which appear to be gathered from locations between the locations of the optical elements in the array of optical elements.

* * * * *